(12) United States Patent
Zhang et al.

(10) Patent No.: US 12,047,178 B2
(45) Date of Patent: Jul. 23, 2024

(54) USER EQUIPMENT AND METHOD FOR TRANSMITTING HARQ FEEDBACK TO ANOTHER USER EQUIPMENT

(71) Applicant: SHARP KABUSHIKI KAISHA, Sakai (JP)

(72) Inventors: Chongming Zhang, Shanghai (CN); Renmao Liu, Shanghai (CN); Shohei Yamada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 453 days.

(21) Appl. No.: 17/422,110

(22) PCT Filed: Jan. 9, 2020

(86) PCT No.: PCT/CN2020/071110
§ 371 (c)(1),
(2) Date: Jul. 9, 2021

(87) PCT Pub. No.: WO2020/143701
PCT Pub. Date: Jul. 16, 2020

(65) Prior Publication Data
US 2022/0085921 A1    Mar. 17, 2022

(30) Foreign Application Priority Data

Jan. 10, 2019  (CN) .......................... 201910025401.5

(51) Int. Cl.
*H04L 1/1812* (2023.01)
*H04L 5/00* (2006.01)
(Continued)

(52) U.S. Cl.
CPC .......... *H04L 1/1812* (2013.01); *H04L 5/0053* (2013.01); *H04W 72/0446* (2013.01); *H04W 72/20* (2023.01); *H04W 92/18* (2013.01)

(58) Field of Classification Search
CPC ... H04L 1/1812; H04L 5/0053; H04L 1/1893; H04L 2001/0097; H04L 1/1664;
(Continued)

(56) References Cited

U.S. PATENT DOCUMENTS

2017/0347394 A1   11/2017  Yasukawa et al.
2020/0029318 A1*  1/2020  Guo ...................... H04L 1/1822
(Continued)

FOREIGN PATENT DOCUMENTS

WO    2018/203738 A1    11/2018

OTHER PUBLICATIONS

Nokia et al., "Data lossless path switch", R2-1703365 3GPP TSG-RAN WG2 Meeting #97bis, Spokane, USA, Apr. 3-7, 2017.
(Continued)

*Primary Examiner* — Tejis Daya
(74) *Attorney, Agent, or Firm* — ScienBiziP, P.C.

(57) ABSTRACT

The present invention provides a method performed by user equipment and user equipment. The method comprises: receiving control information from a base station, the control information comprising a resource configuration related to a transmission on a Physical Sidelink Shared Channel (PSSCH); transmitting data to other UE through the PSSCH according to the control information; and transmitting to the base station first feedback information related to the transmission on the PSSCH and/or second feedback information related to a transmission on a Physical Downlink Shared Channel (PDSCH) between the base station and the UE. In this way, reliable data transmission can be achieved, thereby improving the reliability and stability of an entire communication system.

2 Claims, 3 Drawing Sheets

(51) Int. Cl.
*H04W 72/0446* (2023.01)
*H04W 72/20* (2023.01)
*H04W 92/18* (2009.01)

(58) Field of Classification Search
CPC ... H04L 1/1854; H04L 1/1861; H04L 1/1887; H04L 5/0094; H04L 5/0044; H04L 5/0055; H04W 72/0446; H04W 72/20; H04W 92/18
See application file for complete search history.

(56) References Cited

U.S. PATENT DOCUMENTS

| | | |
|---|---|---|
| 2020/0163028 A1 | 5/2020 | Chae et al. |
| 2020/0313805 A1* | 10/2020 | Park ..................... H04L 1/1812 |
| 2021/0321380 A1* | 10/2021 | Zhao ..................... H04L 1/1896 |
| 2022/0053521 A1* | 2/2022 | Yoshioka ............... H04L 1/1896 |
| 2022/0085923 A1* | 3/2022 | Ye ........................ H04L 1/1607 |

OTHER PUBLICATIONS

Huawei et al., "Support for sidelink unicast, groupcast and broadcast", R1-1810137 3GPP TSG RAN WG1 Meeting #94bis, Chengdu, China, Oct. 8-12, 2018.
CATT, "Discussion on physical layer procedures in NR V2X", R1-1812618 3GPP TSG RAN1 Meeting #95, Spokane, USA, Nov. 12-16, 2018.
Huawei et al., "Sidelink physical layer structure for NR V2X", R1-1812206, 3GPP TSG RAN WG1 Meeting #95, Spokane, USA, Nov. 12-16, 2018.

* cited by examiner

USER EQUIPMENT AND METHOD FOR TRANSMITTING HARQ FEEDBACK TO ANOTHER USER EQUIPMENT

TECHNICAL FIELD

The present invention relates to the technical field of wireless communications. More specifically, the present invention relates to an access control method, a corresponding base station, and corresponding user equipment.

BACKGROUND

Vehicle to Everything (V2X) is a new generation of information and communication technology that connects vehicles with everything, in which V stands for vehicle, and X stands for any object that exchanges information with the vehicle, and X currently mainly includes vehicles, persons, traffic roadside infrastructure, and networks.

In a V2X communication model, transmitting UE is in a V2X working mode 1. In this mode 1, all resources used by the transmitting UE to transmit data are obtained through scheduling and allocation by a base station. As shown in step 1 of FIG. 1, the base station transmits Downlink Control Information (DCI) on a PDCCH, and the DCI carries/schedules resources for transmitting V2X data. Since the V2X data is transmitted on a PSSCH, time-frequency resources for scheduling a PSSCH transmission will be carried in the DCI. A Transport Block (TB) is carried on each PSSCH transmission.

Figure 1:
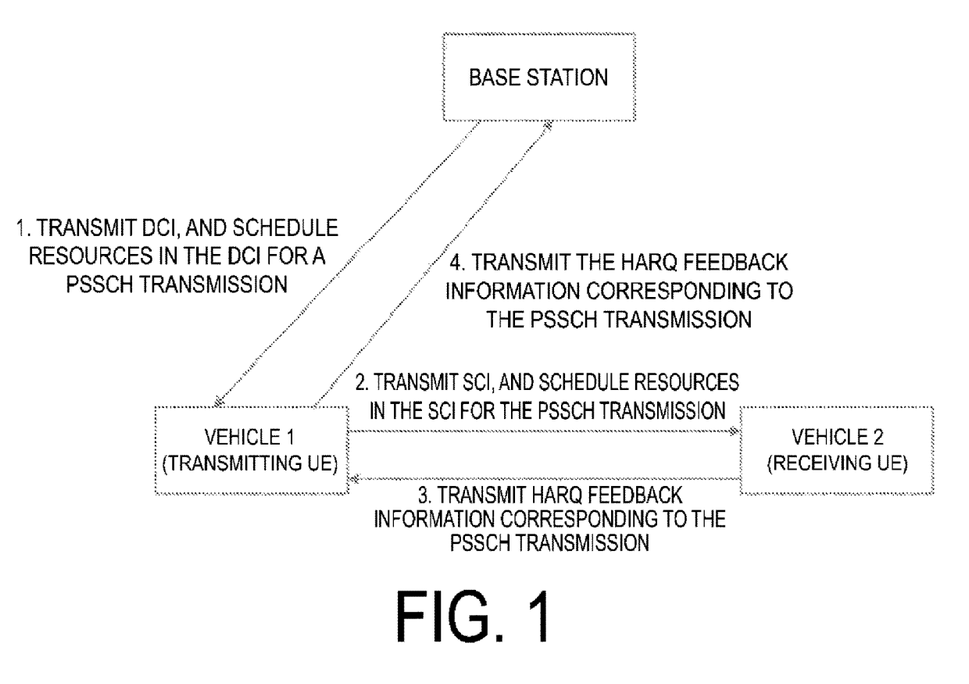
FIG. 1 is a schematic diagram showing information transmission among a base station, transmitting UE, and receiving UE in a V2X communication model.

After receiving the DCI, the transmitting UE will extract related information of the PSSCH transmission and include the extracted information in control information for a V2X transmission, herein called Sidelink Control Information (SCI), and transmit the SCI to receiving UE. See step 2.

In order to improve the reliability of transmission, after receiving the TB transmitted by the transmitting UE, the receiving UE will determine whether the received TB is correctly decoded: if so, the receiving UE will transmit to the transmitting UE positive acknowledgment information, called positive acknowledge (ACK); if not, the receiving UE will transmit to the transmitting UE negative acknowledgment information, called negative acknowledge (NACK). The ACK/NACK information fed back for the V2X transmission herein is collectively referred to as V2X HARQ feedback information. The V2X HARQ feedback information is transmitted through a PSFCH. See step 3.

When receiving V2X HARQ feedback information for a certain TB, such as a NACK, the transmitting UE can determine that the data needs to be retransmitted. Since all resources of the transmitting UE to transmit data are scheduled by the base station, the transmitting UE needs to further inform the base station that the TB has not been correctly received, and new resources are needed for retransmission. Therefore, in step 4, the transmitting UE transmits the HARQ feedback information to the base station. It can be seen that step 4 is a critical step in reliable transmission. How to implement step 4 and transmit the V2X HARQ feedback information to the base station is an issue that needs to be resolved.

It should be noted that in FIG. 1, the communication between the base station and the transmitting UE in steps 1 and 4 may be based on an NR technology or E-UTRAN access technology, but in an NR communication system or an LTE communication system, the communication between the transmitting UE and the base station is referred to as Uu-interface communication. In steps 2 and 3, the communication between the transmitting UE and the receiving UE may also be based on an NR technology or E-UTRAN access technology, but in a V2X communication system, the communication between the transmitting UE and the receiving UE is referred to as PC5-interface communication.

SUMMARY OF INVENTION

In order to resolve at least a part of the aforementioned issue, the present invention provides a method performed by user equipment and user equipment, which implements a scheme of transmitting to a base station first feedback information related to a transmission on a PSSCH and/or second feedback information related to a transmission on a PDSCH between the base station and UE, and can achieve reliable transmission of data, thereby improving the reliability and stability of an entire communication system.

According to the present invention, a method performed by User Equipment (UE), comprising: receiving control information from a base station, the control information comprising a resource configuration related to a transmission on a Physical Sidelink Shared Channel (PSSCH); transmitting data to other UE through the PSSCH according to the control information; and transmitting to the base station first feedback information related to the transmission on the PSSCH and/or second feedback information related to a transmission on a Physical Downlink Shared Channel (PDSCH) between the base station and the UE.

In the foregoing method, it is possible that a first moment as a transmission moment of a Physical Sidelink Feedback Channel (PSFCH) is determined, acknowledgment information related to the data is received from the other UE through the PSFCH at the first moment, and the first feedback information is transmitted to the base station according to the received acknowledgment information at a second moment after the first moment.

In the foregoing method, it is possible that a first moment as a transmission moment of the PSSCH and a second moment as a transmission moment of a corresponding PSFCH are determined, transmission of the data through the PSSCH is started or completed at the first moment, acknowledgment information related to the data is received from the other UE through the PSFCH at the second moment, and the first feedback information is transmitted to the base station at a third moment after the second moment according to the received acknowledgment information.

In the foregoing method, it is possible that as the first feedback information, if the received acknowledgment information is positive acknowledgment information ACK, an ACK is transmitted to the base station; if no acknowledgment information is received or the received acknowledgment information is negative acknowledgment information NACK, a NACK is transmitted to the base station, or if no acknowledgment information is received or the received acknowledgment information is an ACK, an ACK is transmitted to the base station; if the received acknowledgment information is a NACK, a NACK is transmitted to the base station, or if no acknowledgment information is received or the received acknowledgment information is ACK, no information is transmitted to the base station; if the received acknowledgment information is a NACK, a NACK is transmitted to the base station, or if the received acknowledgment information is an ACK, an ACK is transmitted to the base station; if no acknowledgment information is received or the received acknowledgment information is a NACK, no information is transmitted to the base station.

In the foregoing method, it is possible that if the received acknowledgment information is Code Block Group (CBG)-based acknowledgment information, as the first feedback information, CBG-based or Transport Block (TB)-based acknowledgment information is transmitted to the base station.

In the foregoing method, it is possible that the control information comprises configuration information that configures a first resource for transmitting the first feedback information and a second resource for transmitting the second feedback information, the second resource is different from the first resource, and the first resource and the second resource are used to transmit the first feedback information and the second feedback information, respectively.

In the foregoing method, it is possible that the control information comprises instruction information that indicates which of the first feedback information and the second feedback information to transmit if both need to be transmitted at the same time, and if the first feedback information and the second feedback information need to be transmitted at the same time, the first feedback information or the second feedback information is transmitted according to the instruction information.

In the foregoing method, it is possible that the control information comprises an indication of an offset related to the first feedback information when the first feedback information is transmitted on a Physical Uplink Shared Channel (PUSCH).

In the foregoing method, it is possible that a Medium Access Control Control Element (MAC CE) is used to transmit the first feedback information to the base station.

According to the present invention, user equipment is provided, comprising: a processor; and a memory, storing instructions, wherein the instructions, when run by the processor, perform the foregoing method.

Effect of Invention

According to the method performed by user equipment and the user equipment of the present invention, a scheme of transmitting to a base station first feedback information related to a transmission on a PSSCH and/or second feedback information related to a transmission on a PDSCH between the base station and UE is implemented, and reliable transmission of data can be achieved, thereby improving the reliability and stability of an entire communication system.

DETAILED DESCRIPTION

The following describes the present invention in detail with reference to the accompanying drawings and specific embodiments. It should be noted that the present invention is not limited to the specific embodiments described below. In addition, for simplicity, detailed description of the known art not directly related to the present invention is omitted to prevent confusion with respect to the understanding of the present invention.

Prior to the specific description, several terms mentioned in the present invention are illustrated as follows. The terms involved in the present invention shall have the meanings set forth below, unless otherwise indicated.

UE: User Equipment
NR: New Radio
Sidelink
V2X: Vehicle to Everything
PSSCH: Physical Sidelink Shared Channel
PSFCH: Physical Sidelink Feedback Channel
PSCCH: Physical Sidelink Control Channel
PDCCH: Physical Downlink Control Channel
PDSCH: Physical Downlink Shared Channel
PUCCH: Physical Uplink Control Channel
PUSCH: Physical Uplink Shared Channel
HARQ: Hybrid Automatic Repeat Request
CBG: Code Block Group
MAC: Medium Access Control
MAC CE: MAC Control Element
CSI report: Channel Status Information report
SFCI: Sidelink Feedback Control Information In a V2X communication model, transmitting UE is in a V2X working mode 1. In this mode 1, all resources used by the transmitting UE to transmit data are all obtained through scheduling and allocation by a base station. As shown in step 1 of FIG. 1, the base station transmits Downlink Control Information (DCI) on a PDCCH, and the DCI carries/schedules time and frequency resources for transmitting V2X data. Since the V2X data is transmitted on a PSSCH, time-frequency resources for scheduling a PSSCH transmission will be carried in the DCI. Specifically, there may be different fields in the DCI, and each field value indicates time or frequency information. Based on this information, the UE can obtain the time and frequency resources for the PSSCH transmission, and then perform the PSSCH transmission. Each PSSCH transmission will carry a Transport Block (TB). The data is packed in such TBs for transmission.

After receiving the DCI, the transmitting UE will extract related information of the PSSCH transmission and include the extracted information in control information for a V2X transmission, herein called Sidelink Control Information (SCI), and transmit the SCI to receiving UE. See step 2.

In order to improve the reliability of transmission, after receiving the TB transmitted by the transmitting UE, the receiving UE will determine whether the received TB is correctly decoded: if so, the receiving UE will transmit to the transmitting UE positive acknowledgment information, called positive acknowledge (ACK); if not, the receiving UE will transmit to the transmitting UE negative acknowledgment information, called negative acknowledge (NACK). The ACK/NACK information fed back for the V2X transmission herein is collectively referred to as V2X HARQ feedback information. The V2X HARQ feedback information is transmitted through a PSFCH. See step 3.

When receiving V2X HARQ feedback information for a certain TB, such as a NACK, the transmitting UE can determine that the data needs to be retransmitted. Since all resources of the transmitting UE to transmit data are scheduled by the base station, the transmitting UE needs to further inform the base station that the TB has not been correctly received, and new resources are needed for retransmission. Therefore, in step 4, the transmitting UE transmits the HARQ feedback information to the base station.

In FIG. 1, the communication between the base station and the transmitting UE in steps 1 and 4 may be based on an NR technology or E-UTRAN access technology, but in an NR communication system or an LTE communication system, the communication between the transmitting UE and the base station is referred to as Uu-interface communication. In steps 2 and 3, the communication between the transmitting UE and the receiving UE may also be based on an NR technology or E-UTRAN access technology, but in a V2X communication system, the communication between the transmitting UE and the receiving UE is referred to as PC5-interface communication.

A plurality of embodiments according to the present invention are specifically described below, with an NR mobile communications system and its subsequent evolved version serving as exemplary application environments, and with a base station and UE that support NR serving as examples. However, it is to be noted that the present invention is not limited to the following implementations, but may be applied to other wireless communications systems.

In addition, on the Uu interface, when the base station transmits a TB to the UE through a PDSCH, the UE needs to determine whether the TB is correctly decoded, if so, the UE transmits an ACK to the base station through a PUCCH; if not, the UE transmits a NACK to the base station through the PUCCH. The ACK/NACK information is feedback for the TB transmitted on the PDSCH. In order to distinguish the ACK/NACK information from the aforementioned V2X HARQ feedback information, the ACK/NACK information is referred to herein as Uu HARQ feedback information. The difference between the two is that corresponding transmission data is different or physical channels corresponding to data transmission are different: the V2X HARQ feedback information corresponds to a transmission on the PSSCH related to V2X transmission, while the Uu HARQ feedback information corresponds to a transmission on the PDSCH related to Uu communication. These need to be distinguished in Embodiment 4 and 5.

The terms "associated", "corresponding", and "corresponding to" herein may be replaced with each other.

The two terms sidelink and V2X sidelink herein may be replaced with each other.

Herein, V2X HARQ feedback may be one of Sidelink Feedback Control Information (SFCI). Therefore, the method of transmitting V2X HARQ feedback information herein are also applicable to the transmission of other types of sidelink feedback control information, such as a CSI report, etc.

The transmission time/moment involved herein are all expressed in units of slots, as an example. The present invention is not limited to the following implementations, but may also be expressed in units of subframes, the number of symbols, or other specific units of time/moment.

In the following, before describing several embodiments of the present invention in detail, a manner in which the UE determines a PSSCH transmission and a PSFCH transmission will be described.

PSSCH Transmission:

A PSSCH transmission refers to determining time domain and frequency domain resources used for transmission on a physical channel PSSCH, and transmitting data blocks on these determined resources.

Data Transport Blocks (TBs) are transmitted on the PSSCH.

In working mode 1, the PSSCH transmission is implemented through scheduling by a base station. The so-called "scheduling" means that a scheduling party, such as the base station, allocates time domain and frequency domain resources for the PSSCH transmission, and directly or indirectly informs a scheduled party, such as the UE, of information of these resources. That is, the base station transmits DCI on a PDCCH, and information carried in the DCI directly or indirectly indicates the time-frequency resources for the PSSCH transmission. Therefore, it can be said that the DCI schedules the PSSCH transmission. The following "scheduling" can all be understood in this way. The UE uses a DCI format to determine which type of channel transmission the DCI indicates/schedules. Therefore, the DCI format used by the DCI described herein is a DCI format used to schedule the PSSCH transmission.

First, the transmitting UE receives the DCI from the base station that carries the scheduled PSSCH resources, and then the UE needs to determine time information for the PSSCH transmission, that is, when the transmission starts and when the transmission ends. The transmission moment herein may be in units of slots as an example, indicating from which slot the PSSCH transmission starts and to which slot the PSSCH transmission ends, and the transmission moment may also be in units of subframes, the number of symbols, or other units of time/moment.

The UE may determine the PSSCH transmission by using one or more pieces of the following information:
  a moment when the DCI is received, for example, the UE receives the DCI carrying the PSSCH scheduling information in a certain slot;
  a slot offset: the slot offset may be included in the DCI, or predefined, or preconfigured in configuration information transmitted by the base station to the UE, and this offset is used to determine an initial transmission slot on the PSSCH;
  PSSCH numerology: the PSSCH numerology corresponds to subcarrier spacing information and Cyclic Prefix (CP) information of the PSSCH, and the numerology may be preconfigured, or may be carried in the DCI;
  a PSSCH subcarrier spacing configuration: this may be preconfigured, or may be carried in the DCI; and
  a PDCCH subcarrier spacing configuration, which may herein refer to the PDCCH carrying the DCI.

On the basis of one or more pieces of the above information, the UE can determine time for the PSSCH transmission, including time points of starting and ending the transmission. Determining an initial transmission slot is used as an example herein:

Method 1:

The UE receives the DCI in slot N, in which case a PSSCH start slot scheduled by the DCI may be slot N+N1, and an end slot may be slot N+N2, where N1 may be equal to N2, which means that the PSSCH transmission lasts only one slot. Or preferably, N2 is greater than N1, and both N1 and N2 are integers.

Method 2:

On the basis of method 1, the value of the slot offset is set to N1, in which case the start slot of the PSSCH transmission may be slot N+slot offset.

Method 3:

The UE receives the DCI in slot N, the slot offset is N1, the PSSCH subcarrier spacing is m1, and the PDCCH subcarrier spacing configuration is m2, in which case the PSSCH transmission/transmitting slot may be $$\left\lfloor N * \frac{2^{m1}}{2^{m2}} \right\rfloor + N1$$

In the above method, the value N1 of the slot offset is determined according to the PSSCH numerology. The value of the slot offset may also be determined by the following method:

a field may be included in the DCI, which is named time domain resource. The value of the field corresponds to a slot offset value, which may correspond to an entry in a table by lookup. For example, the value of the time domain resource is a list index, in which case in this table, each index may correspond to a slot offset value.

Or the value of the time domain resource and the PSSCH subcarrier spacing jointly determine the value of the slot offset. For example, the value of the time domain resource may be used to look up the table to correspond to a slot offset, but the slot offset is a variable, the value of which needs to be further determined according to the PSSCH subcarrier spacing.

The above methods for determining the PSSCH transmission start slot can all be used to determine the PSSCH transmission end slot. In addition, it is possible that after the UE determines the PSSCH transmission start slot, the UE determines the end slot according to the number of symbols occupied by the transmission. For example, if the PSSCH transmission occupies Z symbols, then Z symbols are consecutively occupied starting from the determined start slot before the end, and a slot to which an end symbol belongs is a moment when the transmission ends.

The foregoing process may be a method for the transmitting UE to determine the PSSCH transmission. For the receiving UE, a method for the receiving UE to determine the PSSCH transmission is similar. The receiving UE does not directly receive the DCI scheduling from the base station, but the receiving UE receives SCI scheduling from the transmitting UE. The PSSCH transmission is scheduled in the SCI, that is, the SCI carries information related to the time domain and frequency domain resources directly or indirectly used for the PSSCH transmission.

The transmitting UE includes the scheduling information related to the PSSCH transmission received thereby in the DCI as content of the SCI and transmits the SCI to the receiving UE, so that the receiving UE can determine the PSSCH transmission. The specific determination method is the same as the above method, with only the DCI in the above scheme replaced with the SCI. In particular, the transmitting UE may also determine the PSSCH transmission according to the content of the SCI set thereby, and a specific method is the same as that of the receiving UE.

PSFCH Transmission:

A PSFCH transmission refers to determining time domain and frequency domain resources used for the PSFCH transmission, and transmitting information on these determined resources. Specifically, this information is acknowledgment information corresponding to the PSSCH transmission, which herein refers to V2X HARQ feedback information.

A PSFCH is a physical channel used by the receiving UE to transmit the V2X HARQ feedback.

The PSFCH is a physical channel used by the transmitting UE to receive the V2X HARQ feedback.

The HARQ feedback means that the UE receives a TB and decodes the TB. If the decoding succeeds, the content of the HARQ feedback is an ACK, and if the decoding fails, the content of the HARQ feedback is a NACK. If data carried in the TB is data related to V2X, or the TB is transmitted on a physical channel related to V2X, such as a PSSCH, then such HARQ feedback information may be referred to as V2X HARQ feedback information. The HARQ feedback is directed at a certain TB. Therefore, the UE needs to clarify a correspondence between the PSFCH and the PSSCH. That is, the UE transmits a TB on a PSSCH, in which case a PSFCH used to transmit HARQ feedback corresponding to this TB has a correspondence to this PSSCH.

The correspondence between the PSFCH and the PSSCH may be determined in the following ways:

Mode 1

There is a correspondence between a PSSCH and a PSFCH scheduled in the same DCI/SCI.

In DCI in which a PSSCH transmission is scheduled, a PSFCH transmission is also scheduled. In a TB transmitted on the PSSCH, corresponding HARQ feedback needs to be transmitted on the PSFCH. Therefore, in this mode, there is a correspondence between the PSSCH and the PSFCH.

Mode 2

There is a correspondence between a PSSCH and a PSFCH scheduled in different DCI.

For example, when the base station schedules a PSSCH in DCI transmitted in slot N3, the UE may consider that if there is DCI in slots from slot N3+1 to slot N3+Z that schedules a PSFCH, then this PSFCH corresponds to a PSSCH transmission scheduled in slot N3. It is also possible that the PSSCH transmission is started in slot N3 and completed in slot N4. The UE may consider that if there is DCI in slots from slot N4+1 to slot N4+Z that schedules a PSFCH, then this PSFCH corresponds to the PSSCH transmission started in slot N3/completed in slot N4.

It is also possible that the PSSCH transmission is started in slot N3 and completed in slot N4. The UE may consider that if there is transmission on a PSFCH in slots from slot N4+1 to slot N4+Z, then this PSFCH corresponds to the PSSCH transmission started in slot N3/completed in slot N4.

On the basis of this correspondence, the UE can determine the corresponding PSFCH transmission according to the PSSCH transmission. Specifically, the PSFCH transmission may be determined by using one or more pieces of the following information:

the PSSCH transmission start/end moment: according to the method of determining the PSSCH transmission described above, the UE can determine the start and end time of the PSSCH transmission; for example, the receiving UE starts receiving the PSSCH transmission in a certain slot, or the receiving UE completes the reception of the PSSCH transmission in a certain slot; or the transmitting UE starts the PSSCH transmission in a certain slot, or the transmitting UE completes the PSSCH transmission in a certain slot;

a PSFCH-slot offset: the PSFCH-slot offset may be included in the DCI, or predefined, or preconfigured in configuration information transmitted by the base station to the UE, and this offset is used to determine an initial transmission slot on the PSFCH;

PSFCH numerology: this may be preconfigured, or may be carried in the DCI;

a PSFCH subcarrier spacing configuration: this may be preconfigured, or may be carried in the DCI; and a PSSCH subcarrier spacing configuration, which may herein refer to the PSSCH scheduled in the DCI.

On the basis of one or more pieces of the above information, the UE can determine time for the PSFCH transmission, including time points of starting and ending the transmission. Determining an initial transmission slot is used as an example herein:

Method 1:

The UE starts/completes/performs the PSCCH transmission in slot N, in which case a corresponding PSFCH start slot may be slot N+N1, and an end slot may be slot N+N2, where N1 may be equal to N2, which means the PSFCH transmission lasts only one slot. Or, N2 is greater than N1, and both N1 and N2 are integers.

Method 2:

On the basis of method 1, the value of the PSFCH-slot offset is set to N1, in which case the PSFCH start slot may be slot N+slot offset.

Method 3:

The UE starts/completes/performs the PSCCH transmission in slot N, the PSFCH-slot offset is N1, the PSFCH subcarrier spacing is m1, and the PSSCH subcarrier spacing configuration is m2, in which case a PSFCH transmission/transmitting slot may be $$\left\lfloor N * \frac{2^{m1}}{2^{m2}} \right\rfloor + N1$$

In the above method, the value N1 of the PSFCH-slot offset may be determined according to the PSFCH numerology. The value of the PSFCH-slot offset may also be determined by the following method:

a field may be included in the DCI, which is named PSFCH time domain resource. The value of the field corresponds to a slot offset value, which may correspond to an entry in a table by lookup. For example, the value of the PSFCH time domain resource is a list index, in which case in this table, each index may correspond to a slot offset value.

Or the value of the PSFCH time domain resource and the PSFCH subcarrier spacing jointly determine the value of the slot offset. For example, the value of the time domain resource may be used to look up the table to correspond to a slot offset, but the slot offset is a variable, the value of which needs to be further determined according to the PSFCH subcarrier spacing.

In addition, the transmitting UE may independently determine the PSFCH transmission, that is, independent of the PSSCH. Specifically, the PSFCH transmission may be determined by using one or more pieces of the following information:

the moment when the DCI is received, for example, the UE receives the DCI carrying PSFCH scheduling information in a certain slot;

the PSFCH-slot offset: the PSFCH-slot offset may be included in the DCI, or predefined, or preconfigured in configuration information transmitted by the base station to the UE, and this offset is used to determine an initial transmission slot on the PSSCH;

the PSFCH numerology: this may be preconfigured, or may be carried in the DCI;

the PSFCH subcarrier spacing configuration: this may be preconfigured, or may be carried in the DCI; and the PDCCH subcarrier spacing configuration, which may herein refer to the PDCCH carrying the DCI.

On the basis of one or more pieces of the above information, the UE can determine time for the PSFCH transmission, including time points of starting and ending the transmission. Determining an initial transmission slot is used as an example herein:

Method 1:

The UE receives the DCI in slot N, in which case the PSFCH start slot scheduled by the DCI may be slot N+N1, and the end slot may be slot N+N2, where N1 may be equal to N2, which means that the PSSCH transmission lasts only one slot. Or, N2 is greater than N1, and both N1 and N2 are integers.

Method 2:

On the basis of method 1, the value of the PSFCH-slot offset is set to N1, in which case the PSFCH start slot may be slot N+slot offset.

Method 3:

The UE receives the DCI in slot N, the slot offset is N1, the PSFCH subcarrier spacing is m1, and the PDCCH subcarrier spacing configuration is m2, in which case the PSFCH transmission/transmitting slot may be $$\left\lfloor N * \frac{2^{m1}}{2^{m2}} \right\rfloor + N1$$

In the above method, the value N1 of the slot offset is determined according to the PSFCH numerology. The value of the slot offset may also be determined by the following method:

a field may be included in the DCI, which is named time domain resource. The value of the field corresponds to a slot offset value, which may correspond to an entry in a table by lookup. For example, the value of the time domain resource is a list index, in which case in this table, each index may correspond to a slot offset value.

Or the value of the time domain resource and the PSFCH subcarrier spacing jointly determine the value of the slot offset. For example, the value of the time domain resource may be used to look up the table to correspond to a slot offset, but the slot offset is a variable, the value of which needs to be further determined according to the PSFCH subcarrier spacing.

The foregoing process may be a method for the transmitting UE to determine the PSFCH transmission. For the receiving UE, a method for the receiving UE to determine the PSFCH transmission is similar. The receiving UE does not directly receive the DCI scheduling from the base station, but the receiving UE receives SCI scheduling from the transmitting UE. The PSFCH transmission is scheduled in the SCI.

The transmitting UE includes the scheduling information related to the PSFCH transmission received thereby in the DCI as content of the SCI and transmits the SCI to the receiving UE, so that the receiving UE can determine the PSFCH transmission. The specific determination method is the same as the above method, with only the DCI in the above scheme replaced with the SCI. In particular, the transmitting UE may also determine the PSFCH transmission according to the content of the SCI set thereby, and a specific method is the same as that of the receiving UE.

On the basis of the determination of the PSSCH transmission time and the determination of the PSFCH transmission time described above, or other existing methods to determine the PSSCH/PSFCH transmission time, when the transmitting UE needs to transmit the received V2X HARQ feedback information to the base station, the following method may serve as a basis.

Figure 2:
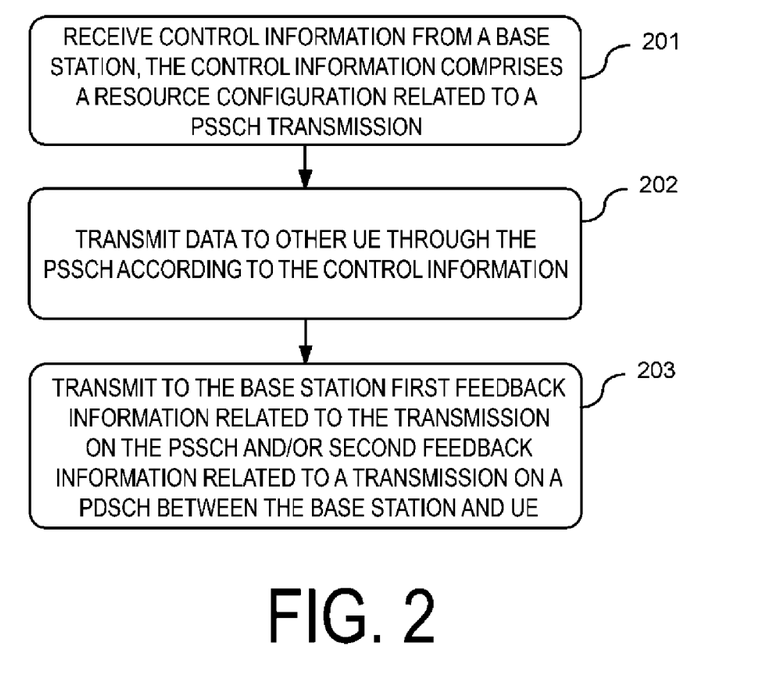
FIG. 2 is a flowchart schematically showing a method performed by user equipment according to an embodiment of the present invention.

FIG. 2 is a flowchart schematically showing a method performed by user equipment according to an embodiment of the present invention. In this method, User Equipment (UE) performs transmission of feedback information to a base station.

Specifically, as shown in FIG. 2, the method performed by the UE includes step 201, step 202, and step 203. In step 201, the UE receives control information from a base station, the control information includes a resource configuration related to a PSSCH transmission. In step 202, the UE transmits data to other UE through a PSSCH according to the control information. In step 203, the UE transmits to the base station first feedback information related to the transmission on the PSSCH and/or second feedback information related to a transmission on a PDSCH between the base station and the UE.

According to the foregoing method, a scheme of transmitting to the base station the first feedback information related to the transmission on the PSSCH and/or the second feedback information related to the transmission on the PDSCH between the base station and the UE is provided, and reliable transmission of data can be achieved, thereby improving the reliability and stability of an entire communication system.

Several embodiments of the present invention are described in detail below.

Embodiment 1

When transmitting UE receives a V2X HARQ feedback from a PSFCH in slot X−Y, the UE needs to transmit a V2X HARQ feedback to a base station in slot X.

Y may be a predefined value. Y may also be included in a DCI transmitted by the base station to the UE. In particular, if a PSFCH is scheduled in this DCI, then a field, PSFCH-to-HARQ-timing-indicator field, may be included in this DCI. The value of this field is Y, that is, this DCI schedules a PSFCH transmission in slot X−Y, in which case the UE needs to transmit the HARQ feedback to the base station in slot X.

Specific operations may be as follows:

The transmitting UE determines a PSFCH transmission moment as slot X−Y according to the method described above or other existing manners.

At the PSFCH transmission moment, the transmitting UE receives the PSFCH transmission and receives a HARQ feedback information carried thereby.

On the basis of the HARQ feedback information received by the UE in slot X−Y, the transmitting UE transmits a HARQ feedback to the base station in slot X.

That "the UE transmits a HARQ feedback information to the base station on the basis of the received HARQ feedback information" may be:

the HARQ feedback information received by the UE in slot X−Y through the PSFCH is an ACK, in which case the UE transmits an ACK to the base station in slot X; if the HARQ feedback information received by the UE in slot X−Y through the PSFCH is a NACK, then the UE transmits a NACK to the base station in slot X;

it is also possible that the HARQ feedback information received by the UE through the PSFCH in slot X−Y is a CBG-based HARQ codebook, in which case the UE transmits a CBG-based HARQ codebook to the base station in slot X, where the CBG means that a TB is divided into several CBs, and an ACK is fed back only when each CB is correctly decoded; when at least one CB is not decoded correctly, a NACK is fed back;

it is also possible that the HARQ feedback information received by the UE through the PSFCH in slot X−Y is a CBG-based HARQ codebook, in which case the UE transmits TB-based HARQ feedback information to the base station in slot X;

it is also possible that the UE does not receive any feedback information through the PSFCH in slot X−Y, in which case the UE transmits an ACK to the base station in slot X; if the HARQ feedback information received by the UE through the PSFCH in slot X−Y is a NACK, then the UE transmits a NACK to the base station in slot X;

it is also possible that the HARQ feedback information received by the UE through the PSFCH in slot X−Y is an ACK, in which case the UE transmits an ACK to the base station in slot X; if the UE does not receive any feedback information through the PSFCH in slot X−Y, then the UE transmits a NACK to the base station in slot X;

it is also possible that the HARQ feedback information received by the UE through the PSFCH in slot X−Y is an ACK, in which case the UE transmits an ACK to the base station in slot X; if the UE does not receive any feedback information through the PSFCH in slot X−Y or the HARQ feedback information received through the PSFCH is a NACK, then the UE does not transmit any information related to the feedback information to the base station in slot X; and it is also possible that the UE does not receive any feedback information through the PSFCH in slot X−Y or the received HARQ feedback information is an ACK, in which case the UE does not transmit any information related to the feedback information to the base station in slot X; if the HARQ feedback information received by the UE in slot X−Y through the PSFCH is a NACK, then the UE transmits a NACK to the base station in slot X.

Another form of the foregoing embodiment may also be: when the transmitting UE receives the HARQ feedback from the PSFCH in slot X, the UE needs to transmit a HARQ feedback to the base station in slot X+Y.

Embodiment 2

When transmitting UE completes a PSSCH transmission in slot X−Y, the UE needs to transmit to a base station a HARQ feedback corresponding to the PSSCH in slot X. The HARQ feedback corresponding to the PSSCH refers to HARQ feedback transmitted on a PSFCH corresponding to the PSSCH.

Y may be a predefined value, or a preconfigured value carried in configuration information transmitted by the base station to the transmitting UE.

Y may also be included in a DCI transmitted by the base station to the UE. In particular, if a PSSCH is scheduled in this DCI, then a field, PSSCH-to-HARQ-timing-indicator field, may be included in this DCI. The value of this field is Y, that is, this DCI schedules the PSSCH in slot X−Y, in which case the UE needs to transmit the HARQ feedback to the base station in slot X. That "this DCI schedules the PSSCH in slot X−Y" may be understood as that the PSSCH scheduled by this DCI completes transmission in slot X−Y, that is, the transmission ends, or may be understood as that the PSSCH scheduled by the DCI starts transmission in slot X−Y.

Specific operations may be as follows:

the transmitting UE determines a PSSCH transmission moment as slot X−Y according to the method described above or other existing manners, and determines a corresponding PSFCH transmission slot W.

In slot X−Y, the transmitting UE starts transmitting the PSSCH/completes transmitting the PSSCH, or the receiving UE starts receiving the PSSCH/completes receiving the PSSCH.

In slot W, the receiving UE transmits the PSFCH, or the transmitting UE receives the PSFCH.

On the basis of the HARQ feedback transmitted on the PSFCH received in slot W, the transmitting UE transmits the HARQ feedback to the base station in slot X.

The "on the basis of the received HARQ feedback information, the UE transmits the HARQ feedback information to the base station" may be:

the HARQ feedback information received by the UE in slot W through the PSFCH is an ACK, in which case the UE transmits an ACK to the base station in slot X; if the HARQ feedback information received by the UE in slot W through the PSFCH is a NACK, then the UE transmit a NACK to the base station in slot X;

it is also possible that the HARQ feedback information received by the UE through the PSFCH in slot W is in units of CBs or is at a CBG level, in which case the UE transmits CBG-level HARQ feedback information to the base station in slot X;

it is also possible that the HARQ feedback information received by the UE through the PSFCH in slot W is in units of CBs or is at a CBG level, in which case the UE transmits TB-level HARQ feedback information to the base station in slot X;

it is also possible that the UE does not receive any feedback information through the PSFCH in slot W, in which case the UE transmits an ACK to the base station in slot X; if the HARQ feedback information received by the UE through the PSFCH in slot W is a NACK, then the UE transmits a NACK to the base station in slot X;

it is also possible that the HARQ feedback information received by the UE in slot W through the PSFCH is an ACK, in which case the UE transmits an ACK to the base station in slot X; if the UE does not receive any feedback information through the PSFCH in slot W, then the UE transmits a NACK to the base station in slot X;

it is also possible that the HARQ feedback information received by the UE in slot W through the PSFCH is an ACK, in which case the UE transmits an ACK to the base station in slot X; if the UE does not receive any feedback information through the PSFCH in slot W or the HARQ feedback information received through the PSFCH is a NACK, then the UE does not transmit any information related to the feedback information to the base station in slot X; and it is also possible that the UE does not receive any feedback information through the PSFCH in slot W or the received HARQ feedback information is an ACK, in which case the UE does not transmit any information related to the feedback information to the base station in slot X; if the HARQ feedback information received by the UE in slot W through the PSFCH is a NACK, then the UE transmits a NACK to the base station in slot X.

The aforementioned ACK may also be expressed as positive acknowledge, and the NACK may also be expressed as negative acknowledge.

Another implementation of the foregoing embodiment may be as follows:

When the transmitting UE completes the PSSCH transmission in slot X, the UE needs to transmit the HARQ feedback corresponding to the PSSCH to the base station in slot X+Y.

Embodiment 3

In Embodiment 1 and Embodiment 2, the transmitting UE may transmit the HARQ feedback to the base station through a PUCCH in slot X.

Embodiment 4

When transmitting UE performs cellular communication with a base station, after receiving a PDSCH transmission transmitted by the base station, if a TB carried on the PDSCH can be correctly received, the transmitting UE needs to feed back an ACK to the base station; if the TB cannot be received correctly or cannot be correctly decoded, the transmitting UE needs to feed back a NACK to the base station. The ACK/NACK herein is collectively referred to as Uu HARQ feedback information, and the Uu HARQ feedback information is transmitted to the base station through a PUCCH.

In Embodiments 1 to 3, the transmitting UE transmits the received HARQ feedback information for the PSSCH transmission to the base station through the PUCCH. In order to distinguish the HARQ feedback information from the foregoing HARQ feedback information, the HARQ feedback information is referred to herein as V2X HARQ feedback information.

Therefore, in slot X determined in Embodiments 1 to 3, the transmitting UE may need to transmit the Uu HARQ feedback information and the V2X HARQ feedback information through the PUCCH.

If the UE transmits both the Uu HARQ feedback information and the V2X HARQ feedback information through the PUCCH on the same frequency domain resource at the same time, it will cause interference and the base station cannot correctly receive the feedback information. In order to solve this problem, there may be the following methods.

Method 1: The base station transmits configuration information to the transmitting UE. The configuration information carries a resource configuration for the PUCCH used to transmit the V2X HARQ feedback information. The resource configuration is different in the frequency domain from PUCCH resources used by the UE to transmit the Uu HARQ feedback information. The difference may be using different carriers, or may be using different Resource Blocks (RBs), thereby distinguishing the PUCCH used to transmit the V2X HARQ feedback information and the PUCCH used to transmit the Uu HARQ feedback information.

Method 2: When the UE needs to transmit the Uu HARQ feedback information and the V2X HARQ feedback information at the same moment, the UE always transmits the Uu HARQ feedback information. That is, when the UE determines to transmit the V2X HARQ feedback information through the PUCCH in slot X, and also determines to transmit the Uu HARQ feedback information through the PUCCH in slot X, the UE does not transmit the V2X HARQ feedback information through the PUCCH in slot X, but transmits the Uu HARQ feedback information through the PUCCH.

Method 3:

Similar to method 2 in which transmission of the V2X HARQ feedback information is cancelled, transmission of the Uu HARQ feedback information is cancelled in method 3.

When the UE needs to transmit the Uu HARQ feedback information and the V2X HARQ feedback information at the same moment, the UE always transmits the V2X HARQ feedback information. That is, when the UE determines to transmit the V2X HARQ feedback information through the PUCCH in slot X, and also determines to transmit the Uu HARQ feedback information through the PUCCH in slot X, the UE does not transmit the Uu HARQ feedback information in slot X (through the PUCCH), but instead, transmits the V2X HARQ feedback information through the PUCCH.

By pre-agreement, no matter whether method 2 or method 3 is employed, the base station can always identify whether the feedback information fed back on the PUCCH is the Uu HARQ feedback information or the V2X HARQ feedback information.

In addition, a configuration method may also be used to indicate which type of HARQ feedback information the UE always transmits in such scenarios where simultaneous transmission is required. The base station can transmit configuration information to the UE in advance, and the configuration information carries an instruction instructing the UE to transmit which type of HARQ feedback information; the UE determines how to perform transmission according to the received instruction: if the UE is instructed to transmit the V2X HARQ feedback information, then method 3 is used; if the UE is instructed to transmit the Uu HARQ feedback information, then method 2 is used.

Embodiment 5

In Embodiments 1 to 3, the transmitting UE may determine to transmit, to the base station through the PUCCH in slot X, the HARQ feedback information received thereby for the PSSCH transmission, which is referred to herein as the V2X HARQ feedback information.

Uu-interface communication between the transmitting UE and the base station will transmit data to the base station through a PUSCH. The transmission on the PUSCH will last for one or several slots. When slot X falls in the slot occupied by the PUSCH transmission, it can be considered that the PUCCH transmission and the PUSCH transmission overlap, in which case how to transmit the V2X HARQ feedback information is a problem that needs to be solved.

Herein provided is a method for transmitting the V2X HARQ feedback information on the PUSCH.

In an existing mechanism, the HARQ feedback information (see Embodiment 4 for definition) may also be multiplexed on the PUSCH for transmission. DCI for scheduling the PUSCH transmission includes a field beta_offset indicator, and the beta_offset indicator carries an indication of an offset related to the HARQ feedback information. This offset can be used to calculate the number/quantity of coded modulation symbols, and these modulation symbols are used to transmit/carry the HARQ feedback information.

In order to transmit the V2X HARQ feedback information on the PUSCH, a field may be included in the DCI scheduling the PUSCH transmission (the existing beta_offset indicator field may be reused, or a new V2X beta_offset indicator field may be defined). An indication of the offset related to the V2X HARQ feedback information is carried in this field. The offset is used to calculate the number/quantity of coded modulation symbols, and these modulation symbols are used to transmit/carry the V2X HARQ feedback information.

This "indication of the offset related to the V2X HARQ feedback information" may be an indication corresponding to a sequence number, and each sequence number may correspond to a value of the offset related to the V2X HARQ feedback information. Optionally, this sequence number may also correspond to a value of the offset related to the HARQ feedback information at the same time.

Embodiment 6

In Embodiment 3, a method for transmitting the V2X HARQ feedback information using a PUCCH is provided. In this embodiment, a method for transmitting the V2X HARQ feedback information using a MAC PDU is provided.

In order to feed back the V2X HARQ feedback information, a MAC CE may be defined to transmit the V2X HARQ feedback information.

At least one or more pieces of the following information is included in this MAC CE:
a MAC CE header, used to indicate that this MAC CE is used to transmit HARQ feedback information;
HARQ feedback information corresponding to one or more PSSCH transmissions;
PSSCH transmission time/moment related information; and
PSFCH transmission time/moment related information.

In a first example, a MAC CE includes time information slot C when a PSSCH transmission is completed and HARQ feedback information corresponding to the PSSCH transmission, which may be represented by one bit, for example, 0 represents a NACK and 1 represents an ACK.

In this case, when a base station receives such a MAC CE, the base station can know the PSSCH transmission completed in slot C, and whether the corresponding HARQ feedback of a TB transmitted on the PSSCH is an ACK or a NACK, that is, whether the TB is correctly decoded or correctly received.

A variant of the above method may be: a MAC CE includes time information slot C of a certain PSFCH transmission or completion of the transmission and HARQ feedback information carried by the PSFCH transmission, which may be represented by one bit, for example, 0 represents a NACK and 1 represents an ACK.

In this case, the transmitting UE transmits the MAC CE to the base station. When the base station receives such a MAC CE, the base station can know that the PSFCH transmission has been performed in slot C. According to the method mentioned at the beginning of this disclosure or other existing methods, the base station can further determine transmission of a PSSCH corresponding to the PSFCH transmitted in slot C, so as to know whether corresponding HARQ feedback of a TB transmitted on the PSSCH is an ACK or a NACK, that is, whether the TB is correctly decoded or correctly received.

A specific MAC CE format may be as follows:

| MAC CE header | Time information bit | HARQ feedback information bit |

In a second example, a MAC CE may include time information slot C of start/completion of a certain PSSCH transmission and HARQ feedback information corresponding to plurality of PSSCH transmissions, which may be represented using a bitmap.

In this case, the transmitting UE transmits the MAC CE to the base station. When the base station receives such a MAC CE, the base station can know the PSSCH transmission started/completed during a period from slot C to slot C+X (or slot C−X to slot C), whether corresponding HARQ feedback of a TB transmitted on the PSSCH is an ACK or a NACK, that is, whether the TB is correctly decoded or correctly received.

X may be predefined, or preconfigured by the base station for the UE.

A variant of the foregoing manner may be: a MAC CE may include time information slot C of a certain PSFCH transmission and HARQ feedback information carried by a plurality of PSFCH transmissions, which may be represented using a bitmap.

In this case, the transmitting UE transmits the MAC CE to the base station. When the base station receives such a MAC CE, the base station can know the PSFCH transmission performed during a period from slot C to slot C+X (or slot C−X to slot C). According to the method mentioned at the beginning of this disclosure or other existing methods, the base station can further determine PSSCH transmissions corresponding to these PSFCH transmissions, so as to know whether corresponding HARQ feedback of TBs transmitted on these PSSCHs are ACKs or NACKs, that is, whether these TBs are correctly decoded or correctly received.

X may be predefined, or preconfigured by the base station for the UE.

A specific MAC CE format may be as follows:

| MAC CE header | Time information bit | HARQ feedback information bit (bitmap) |
| --- | --- | --- |

In a third example, a period may be defined, and the UE may periodically report such a MAC CE that includes HARQ feedback information, which may be represented in the form of a bitmap in which 0 represents a NACK and 1 represents an ACK.

A specific MAC CE format may be as follows:

| MAC CE header | HARQ feedback information bit (bitmap) |
| --- | --- |

This period may be defined in such a way that the base station configures the UE with resources for a configured grant, and this configured grant is an uplink grant (UL grant), and may have a fixed period. The transmitting UE receives one or more PSFCH transmissions in one period. According to the PSFCH received in this period, the transmitting UE can generate a bitmap, and each bit corresponds to one PSFCH transmission, and then the MAC CE carries this bitmap, and is transmitted to the base station.

As an example in units of slots herein, assuming that the configured grant period configured for the UE is T slots, when the UE transmits the MAC CE in slot W, the base station can know information fed back through the PSFCH from slot W−T to slot W−1. According to the method mentioned at the beginning of this disclosure or other existing methods, the base station can further determine transmission of a PSSCH corresponding to each PSFCH, so as to know whether these TBs carried on the PSSCH transmission are correctly received.

The operations may also be implemented in such a way that the transmitting UE completes one or more PSSCH transmissions in one period, in which case the UE carries HARQ feedback information corresponding to these PSSCH transmissions in a MAC CE. Similarly, assuming that the configured grant period configured for the UE is T slots, when the UE transmits the MAC CE in slot W, the base station can know corresponding HARQ feedback information of the PSSCH transmission completed during the period from slot W−T to slot W−1.

In addition, this period may be individually configured T1, and T1 may be less than or equal to T.

In a fourth example,
the transmitting UE only indicates information of a TB (or a PSSCH transmission) whose feedback information is a NACK or an ACK in a generated MAC CE.

The MAC CE may include one or several pieces of time information, for example, in the form of slots, each piece of time information corresponds to a PSSCH transmission, which may be a start moment of the PSSCH transmission, or a reception moment, and corresponding HARQ feedback information of the PSSCH transmission corresponding to such time information is all NACKs or all ACKs.

After the base station receives such a MAC CE, the base station can determine failure/success in decoding of the PSSCH transmissions at those moments, so as to determine whether it is necessary to retransmit TBs transmitted on these PSSCHs.

Figure 3:
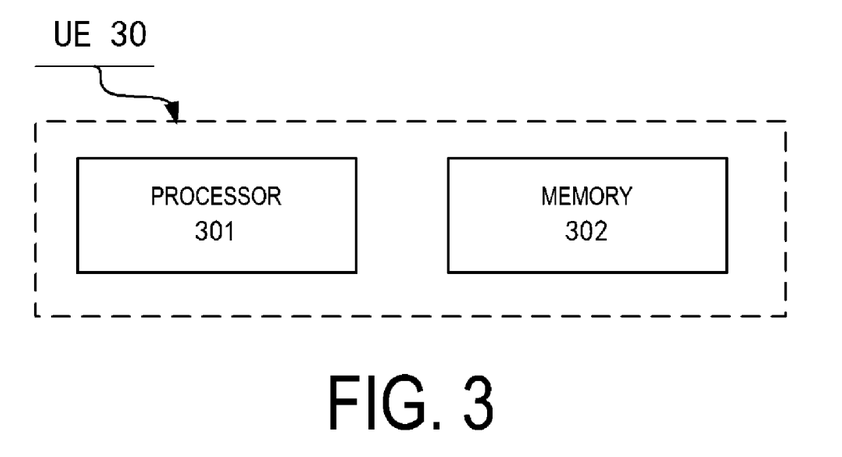
FIG. 3 is a block diagram schematically showing user equipment according to the present invention.

FIG. 3 is a block diagram showing User Equipment (UE) involved in the present invention. As shown in FIG. 3, the UE 30 includes a processor 301 and a memory 302. The processor 301 may include, for example, a microprocessor, a microcontroller, an embedded processor, and the like. The memory 302 may include, for example, a volatile memory (such as a Random Access Memory (RAM)), a Hard Disk Drive (HDD), a non-volatile memory (such as a flash memory), or other memories. The memory 302 stores program instructions. The instructions, when run by the processor 301, can perform the foregoing method performed by user equipment as described in detail in the present invention.

The program running on the device according to the present invention may be a program that enables the computer to implement the functions of the embodiments of the present invention by controlling a central processing unit (CPU). The program or information processed by the program may be temporarily stored in a volatile memory (for example, a Random Access Memory (RAM)), a Hard Disk Drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. A user equipment, comprising:
   one or more processors; and
   a memory in electronic communication with the one or more processors, wherein instructions stored in the memory are executable to:
      receive first Hybrid Automatic Repeat Request (HARQ) information from a Physical Sidelink Feedback Channel (PSFCH) in a first slot;
      transmit, to a base station, second HARQ information in a Physical Uplink Control Channel (PUCCH) in a k-th slot after the first slot based on the first HARQ information received from the PSFCH; and
      transmit third HARQ information as negative acknowledge (NACK) in the PUCCH in the k-th slot after a second slot on a basis that nothing is received from a PSFCH in the second slot,
   wherein the k is indicated by the base station.

2. A method performed by a user equipment (UE), comprising:
   receiving first Hybrid Automatic Repeat Request (HARQ) information from a Physical Sidelink Feedback Channel (PSFCH) in a first slot;
   transmitting to a base station, second HARQ information in a Physical Uplink Control Channel (PUCCH) in a k-th slot after the first slot based on the first HARQ information received from the PSFCH; and
   transmitting third HARQ information as negative acknowledge (NACK) in the PUCCH in the k-th slot after a second slot on a basis that nothing is received from a PSFCH in the second slot,
   wherein the k is indicated by the base station.

* * * * *